July 26, 1932.  E. MANNING  1,868,947
QUICK FLUSHING VALVE FOR MILK PASTEURIZING MACHINES
Filed May 29, 1926
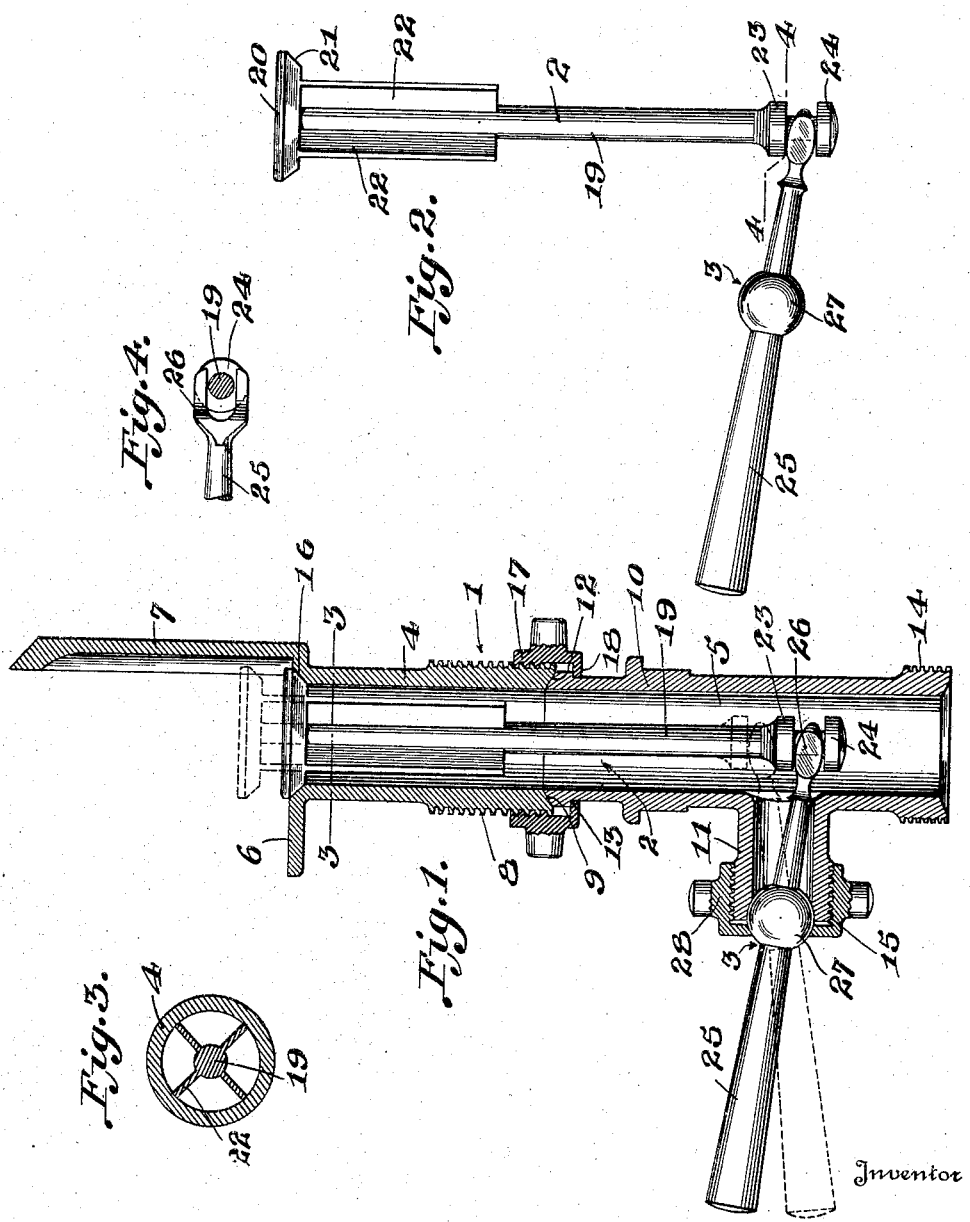
Inventor
Edward Manning
By
Attorneys Patented July 26, 1932

1,868,947

UNITED STATES PATENT OFFICE

EDWARD MANNING, OF RUTLAND, VERMONT, ASSIGNOR TO MANNING MANUFACTURING CO., OF RUTLAND, VERMONT

QUICK FLUSHING VALVE FOR MILK PASTEURIZING MACHINES

Application filed May 29, 1926. Serial No. 112,596.

This invention relates to a valve, and more particularly relates to a flush gate valve especially adapted to be used on pasteurizing or other machines employed in the milk industry, although it may be used for any number and variety of purposes. The ordinary thick wall pasteurizing machines now in use employ the common perfection or molasses gate. The employment of such a gate allows the milk in the machine to run into a pocket the length of the gate, the thickness of the wall of the machine thus "pocketing" the milk. The disadvantages resulting from such pocketing of the milk are well known.

An object of the invention is to provide a valve which, when used on a pasteurizing or other milk machine, will eliminate the pocketing of the milk.

Another object is to provide a valve for machines used in the milk industry which is more sanitary in that the entire apparatus may be readily taken apart for cleaning and sterilizing.

Another object is to provide a valve which will be normally closed by the pressure of the liquid in the machine.

Other objects and advantages will hereinafter appear.

An embodiment of the invention is illustrated in the accompanying drawing, wherein, Figure 1 is a vertical sectional view through the valve.

Figure 2 is a detailed view showing the valve head, stem and operating means.

Figure 3 is a transverse section taken on line 3—3 of Figure 1, while,

Figure 4 is a view taken on line 4—4 of Figure 2.

The valve comprises in general a casing 1, a valve proper 2, and an operating mechanism 3. The casing 1 is formed of two main members 4 and 5. The member 4 constitutes the inner portion of the valve casing and is provided at its inner end with a portion 6. Projecting from the portion 6 at substantially right angles thereto, is a portion 7 which may be utilized for attaching the valve to the machine upon which it is to be used. The outer end of the inner portion 4 is provided with external screw threads 8. The extreme outer edge of the inner portion has an upwardly inclined seat 9 formed thereof, the purpose of which will be more fully explained hereinafter.

The outer portion 5 comprises a main portion 10 having an offset portion 11 projecting therefrom intermediate its ends. The extreme inner edge of the outer member is provided with an inclined seat 12 complementary to the inclined seat 9 of the inner portion, the two seats forming the connecting point between the two portions. Adjacent the inclined seat 12 the outer member is provided with an external annular flange 13 having one side bevelled and flush with and supplementary to the inclined seat 12 and having the other side forming an annular shoulder perpendicular to the casing. The outer end of the portion 5 is provided with exterior screw threads 14, while the outer end of the part 11 is similarly provided with external screw threads 15. The extreme outer edge of the part 11 is formed with a concave seat, the purpose of which will be more fully explained hereinafter.

The inner and outer portions 4 and 5 are provided with longitudinally extending bores which will form when the two sections are joined together a complete passage through the casing. The part 11 is also provided with a bore extending to the bore in the part 5.

The interior circumference in the part 4 is bevelled at its innermost end to form a valve seat 16. A clamping nut 17 is used to connect the two sections 4 and 5. This nut is interiorly threaded for coactively engaging the exterior threads 8 of the inner portion, while the lower edge of the nut has an internally projecting annular flange 18 adapted to fit rotatably around the outer portion 5 of the casing adjacent said perpendicular shoulder of the flange 13. It will be apparent that when the nut 17 is screwed up upon the threads 8, the flange 18 will engage against said perpendicular shoulder of the flange 13 and draw the two sections tightly together.

The valve 2 comprises a valve stem 19 having a valve head 20 arranged upon its inner end. The valve head 20 is provided with a bevelled portion 21 which is complementary to the valve seat 16, and is adapted to seat therein. Projecting from the valve stem and extending radially thereof are fin members 22. These fin members are adapted to fit within the bore of the valve casing and to support and steady the valve stem in its movement therein. The outer end of the valve stem is provided with two spaced heads 23 and 24.

The operating means 3 comprises an operating handle 25 on one end and a fork 26 on the other end. The fork 26 is adapted to pass around the valve stem 19 between the heads 23 and 24. A spherical portion 27 is arranged intermediate the handle 25 and the fork 26. The operating member 3 is adapted to be passed through the bore in the part 11 and the fork 26 engaged with the valve stem 19. The spherical portion 27 will rest in the concave seat previously mentioned as being formed in the end of part 11. An interiorly threaded nut 28 is passed over the member and screwed upon the exterior threads 15 upon the part 11. This nut 28 is provided with a central opening therein, the inner side of which has a concave seat complementary to the concave seat formed in the end of the part 11. It will be apparent that the spherical portion 27 will have a substantial universal movement within the two complementary concave seats.

From the foregoing description it will be readily seen that when the parts are assembled as shown in Figure 1, that the valve head 20 will normally rest upon its seat 16. This tendency of the valve will be brought about by the weight of the liquid within the machine upon which the valve is used. When it is desired to open the valve, the handle 25 is moved, as shown on dotted lines in Figure 1, and the fork 26 engaging against the head 23 will carry the valve stem and valve head inwardly to the dotted line position shown in Figure 1. When the handle is moved backwardly the parts will resume the full line position. In order to connect the valve casing to a distributing pipe line or other means, the external screw threads 14 upon the lower portion 5 are provided. It will be apparent that such connection can be made in any preferred and well known manner. It will also be seen that the entire valve may be readily disassembled for cleaning and sterilizing.

When the valve is used upon a pasteurizing or other milk machine, it is adapted to be in a horizontal position adjacent the bottom of the machine, so that the operating handle 3 will project upwardly.

Having described a specific embodiment of the invention, the following claim is appended hereto with the understanding, however, that the invention is susceptible of various modifications and adaptations within the scope of the said claim.

What I claim is:

Valve for milk pasteurizers and the like comprising a casing including coaxial conduit fittings having the same interior diameter and having co-operating self-centering sealing faces, quick detachable means for securing said fittings together at said sealing faces, a valve stem in said casing intersecting the plane of the intersection of said sealing faces and said coaxial conduit, a valve on said stem engaging a seat in one fitting, the other fitting having a lateral branch opening into said fitting opposite the other end of said valve stem, a valve operating handle extending through said lateral branch and having a yoke freely and removably engaging within a channel on said valve stem, means cooperating with said handle to form a quick detachable universal seat for said handle, the latter having a universal protuberance engaging said seat, said valve stem having a guiding feather engaging solely the inner surface of the fitting which is provided with the valve seat.

EDWARD MANNING.